United States Patent [19]
Dobschal

[11] Patent Number: 5,835,263
[45] Date of Patent: Nov. 10, 1998

[54] OPTICAL ARRANGEMENT FOR COUPLING A BEAM INTO THE VIEWING OR RECORDING BEAM PATH OF A MICROSCOPE

[75] Inventor: Hans-Jürgen Dobschal, Jena, Germany

[73] Assignee: Carl Zeiss Jena GmbH, Jena, Germany

[21] Appl. No.: 679,903

[22] Filed: Jul. 15, 1996

[30] Foreign Application Priority Data

Jul. 13, 1995 [DE] Germany .................. 195 25 520.8

[51] Int. Cl.[6] .................. G02B 21/36; G02B 5/18
[52] U.S. Cl. .................. 359/369; 359/368; 359/567
[58] Field of Search .................. 359/368–390, 359/15, 566, 572, 574; 356/128, 305, 394, 397

[56] References Cited

U.S. PATENT DOCUMENTS

| | | | |
|---|---|---|---|
| 3,867,009 | 2/1975 | Pawluczyk | 359/368 |
| 4,533,220 | 8/1985 | Kurita et al. | 359/368 |
| 4,568,152 | 2/1986 | Merstallinger et al. | 359/368 |
| 4,591,270 | 5/1986 | Ahlen | 359/572 |
| 5,274,478 | 12/1993 | Yang | 359/15 |
| 5,557,453 | 9/1996 | Schalz et al. | 359/376 |

FOREIGN PATENT DOCUMENTS

| | | |
|---|---|---|
| 0088985 | 3/1983 | European Pat. Off. . |
| 0157958 | 10/1985 | European Pat. Off. . |
| 0278395 | 8/1988 | European Pat. Off. . |
| 0305096 | 3/1989 | European Pat. Off. . |
| 0526067 | 2/1993 | European Pat. Off. . |
| 3246832 | 6/1983 | Germany . |
| 3623394 | 4/1987 | Germany . |
| 3623613 | 1/1988 | Germany . |
| 3931919 | 7/1990 | Germany . |
| 3-223807 | 10/1991 | Japan .................. 359/369 |
| 2 251 089 | 6/1992 | United Kingdom .................. 359/368 |

OTHER PUBLICATIONS

Jean Claude Chastang, In: "Oblique Viewing Attachment for Microscope" Proceedings of SPIE—vol. 399, pp. 239–245, Apr. 19, 1983.

*Primary Examiner*—Thong Nguyen
*Attorney, Agent, or Firm*—Walter Ottesen

[57] ABSTRACT

The invention is directed to an optical arrangement for coupling radiation into the viewing or recording beam path of a microscope and includes at least one light-diffracting element in this beam path. Preferably, the light-diffracting element is combined with at least one reflective element or a combination of at least two diffractive elements such as transmission or reflection gratings.

10 Claims, 4 Drawing Sheets

OPTICAL ARRANGEMENT FOR COUPLING A BEAM INTO THE VIEWING OR RECORDING BEAM PATH OF A MICROSCOPE

BACKGROUND OF THE INVENTION

Partially transmitting mirrors such as mirror 1 shown in FIG. 1 are used when coupling beam paths into a microscope. The partially transmitting mirror permits primary light (arrows 20) coming from the microscope objective to pass in the direction of a barrel lens 2 which images in an intermediate plane 17; whereas, the additional light coming from an in-coupling object 3 via an in-coupling optic 4 is coupled in by reflection.

Arrangements of this kind are shown, for example, in European patent publication 088,985 as well as in German patent publication 3,623,394. Depending upon the application, additional information, supplementary images or simple LCD displays can be reflected in to a viewer or surgeon in order to facilitate viewing or manipulation.

Also, illumination is reflected into incident-light microscopes via a partially-transmitting mirror as shown in German patent publications 3,623,613; 3,931,919; and, 3,623, 394.

In the above-mentioned cases, these mirrors are mounted at an angle of 45° to the primary light channel and occupy a relatively large space because of their inclined position including the mirror thickness.

This stands in contradiction to a configuration which is as compact as possible. In order to reduce the space with classical means, the size of the mirror must be significantly reduced which has, as a consequence, that:

(1) the beam diameter of the in-coupled beam path has to be significantly less than the beam diameter of the primary light beam; and, (2) the mirror edges are within the primary beam path which leads to disturbing effects (scattered light and nonhomogeneous pupil).

European patent publications 0,157,958; 0,278,395; 0,305,096; and 0,526,067 all relate to head-up displays, that is, reflecting data or displays into the viewing field of pilots or drivers of motor vehicles.

The head-up displays include the use of transmitting or reflecting gratings imaging into the viewing field. The special problem of space requirements and compactness as it is known in microscopes is not present in the arrangements shown therein.

A suggestion as to the special conditions for the imaging beam path in microscopes cannot be found in these publications.

In German patent publication 3,246,832, a beam splitter is provided in a display device for a photographic camera. The beam splitter has several rows of grooves on a glass plate and these grooves are in the form of a symbol or character to be shown. The symbol or character is illuminated laterally and the grooves deflect a portion of the lateral illuminating light in the direction of the ocular of the camera. This type of in-coupling is complex technologically and is limited to the particular symbol or character which is etched in.

SUMMARY OF THE INVENTION

It is an object of the invention to couple in any desired in-coupled object such as supplementary images in a microscope beam path which requires the least possible amount of space.

The optical arrangement of the invention is for coupling in an object beam defining an object such as a supplementary image, additional data or additional illumination into the viewing or recording beam path of a microscope having a light channel for the beam path and being equipped with viewing or recording means. The optical arrangement includes a diffracting element mounted in the beam path for coupling the object beam into the microscope beam path in the direction toward the viewing or recording means.

With the use of the diffractive optics, it is surprisingly possible to satisfy the above-mentioned requirements in a microscope.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
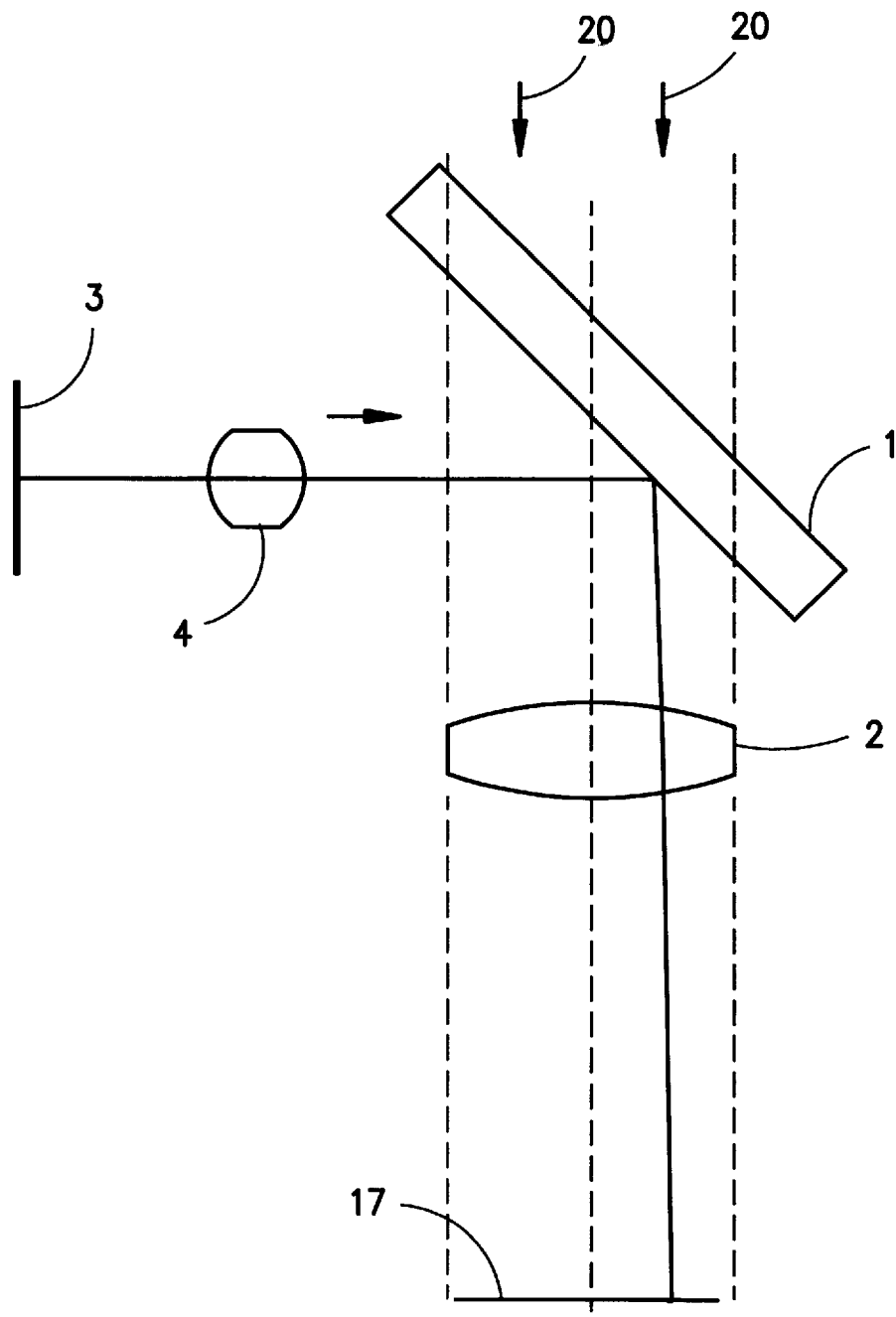
FIG. 1 is a schematic showing a partially-transmissive mirror for coupling in beam paths into a microscope.
Figure 2:
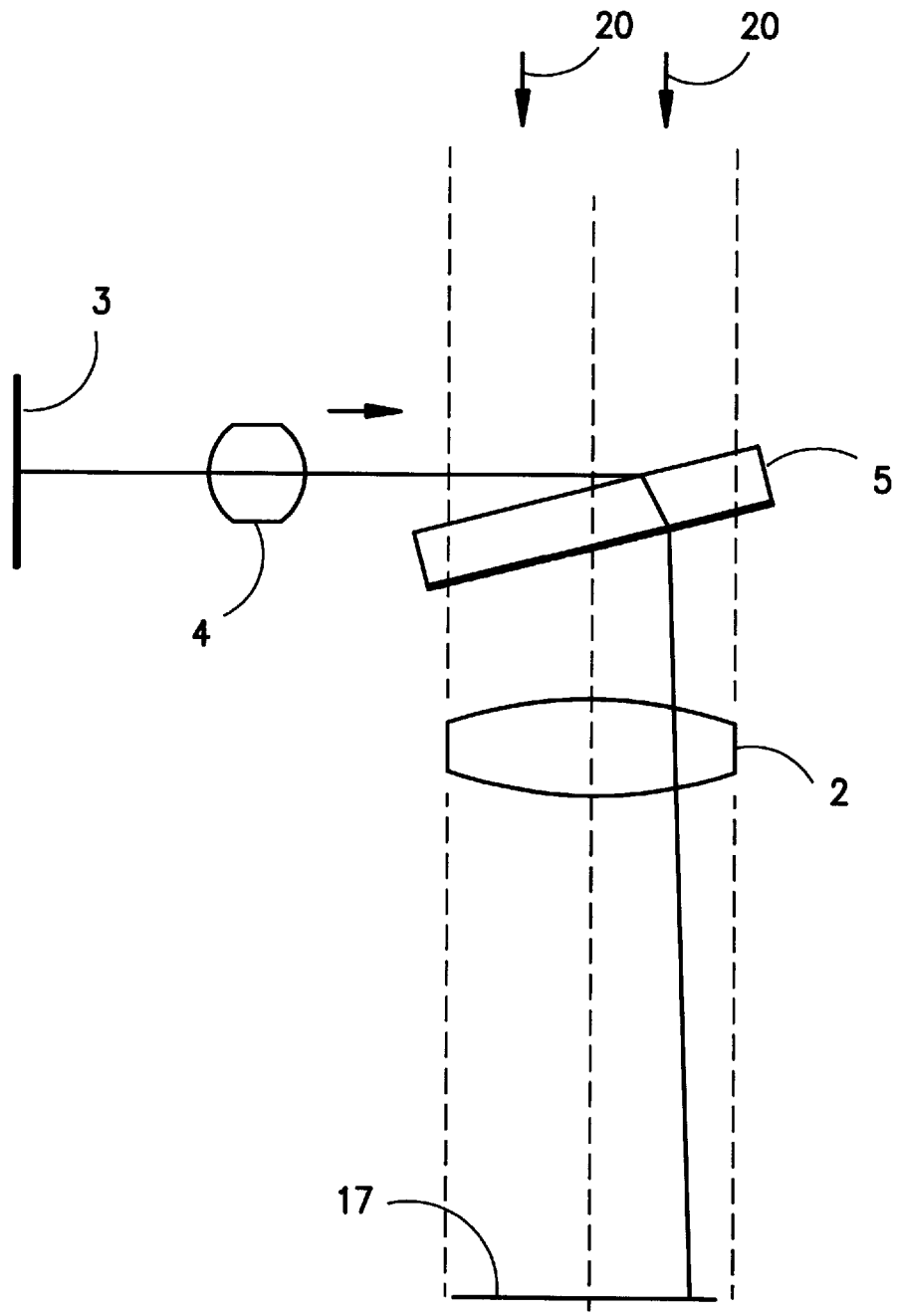
FIG. 2 shows a transmission diffraction grating for coupling a beam path into the primary light beam.

As noted above, the requirements mentioned can be surprisingly satisfied utilizing diffractive optics. In the simplest case, this can be achieved by utilizing an individual transmission diffraction grating 5 as shown in FIG. 2. The angle of the surface normal of the diffraction grating to the optical axis of the primary light channel can be held so small that a significant reduction of the space requirement is obtained.

The size of the diffractive element extends over the width of the entire light channel so that no edges of the element extend directly through the light channel whereby no scatter light can occur as in the case of a small mirror.

The primary light (arrows 20) is conducted via the zero diffraction order of the grating; whereas, the first order is diffracted far enough outside of the desired beam path because of the small grating constant and therefore cannot generate stray light.

The relationship between the incident angle $\alpha$ and the diffraction angle $\beta$ of the individual diffraction orders is computed in a manner known per se:

$$\sin \alpha + \sin \beta = k * \lambda * g$$

wherein:

k=order of diffraction;

$\lambda$=light wavelength; and, g=number of lines on the grating.

The light reflected in is superposed on the primary light by the diffracted first order diffraction; whereas, the zero diffraction order and the higher diffraction orders run outside of the primary light beam.

Because of the dispersion of the grating, the method functions only in a precise manner for monochromatic light. In the case of the use of polychromatic light, a compensating effect for the grating dispersion is necessary (achromatization). Therefore, two gratings are used in accordance with the invention and they are especially advantageous for the following reasons:

(1) the gratings have essentially the same grating constant;

(2) the gratings are so arranged to each other that the diffraction angle $\beta_1$ on the first grating is equal to the incidence angle $\alpha_2$ on the second grating; and, (3) the incidence angle $\alpha_1$ on the first grating is equal to the diffraction angle $\beta_2$ on the second grating.

In the case that the incidence angles or diffraction angles are not in the same medium, then the relationships (2) and (3) above must be made somewhat more precise as follows:

$$n_1 * \sin(\beta_1) = n_2 * \sin(\alpha_2) \qquad (2)$$

$$n_3 * \sin(\alpha_1) = n_4 * \sin(\beta_2) \qquad (3)$$

wherein:

$n_1$ is the refractive index after the first diffraction;

$n_2$ is the refractive index before the second diffraction;

$n_3$ is the refractive index before the first diffraction;

$n_4$ is the refractive index after the second diffraction.

Preferably, both gratings are applied to a common base body which can be introduced as a flat slider perpendicular to the axis of the primary light beam. Depending upon the mode of the method, the gratings are configured as combinations of transmission and reflection gratings.

Figure 3:
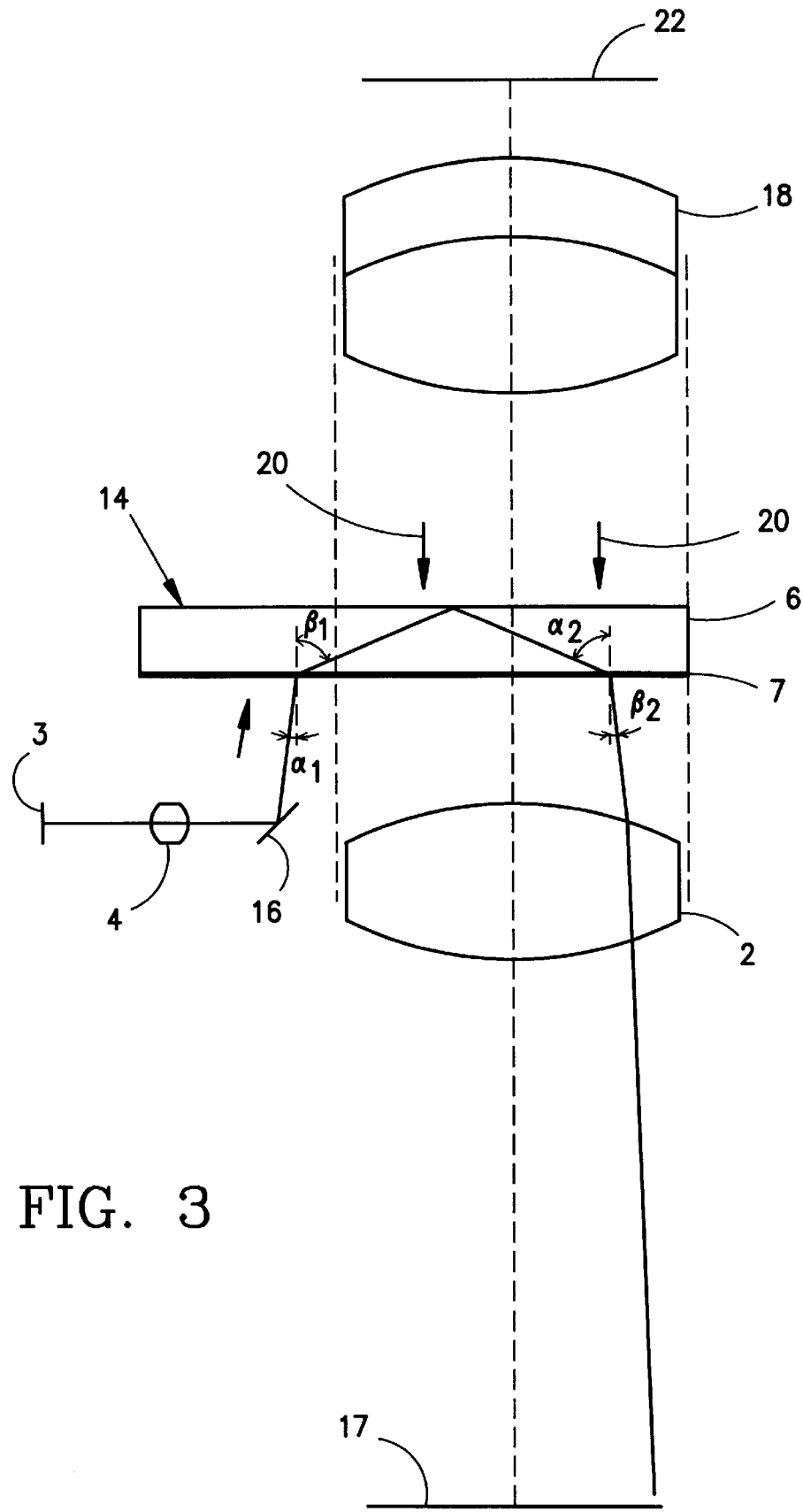
FIG. 3 is a schematic of an embodiment of the invention wherein a combination of two gratings is used to couple a beam into the primary light of a microscope; and, FIG. 4 shows another especially advantageous embodiment of the invention.

One such embodiment is shown in FIG. 3. Here, the diffracting element 14 comprises a flat glass plate 6 having a lower side to which a transmission grating 7 is applied. The light to be coupled in comes from the in-coupling object 3 (for example, a light source or a picture reproduction device) via the in-coupling optic 4 in the form of a beam of parallel rays outside of the primary light channel. The picture reproduction device can, for example, be a display screen or an LCD device. This beam is then reflected at reflecting surface 16 as shown and is diffracted in the glass plate 6 and is totally reflected at the upper glass plate side. The in-coupled light then leaves the diffracting element 14 in the desired direction by thereafter being diffracted at grating 7.

The transmitting lens 2 generates an image of the in-coupled object in the intermediate image plane 17. The incident angle $\alpha_1$ and the grating constant at the grating are so selected that, on the one hand, a total reflection is provided at the upper side of the plate and, on the other hand, the field angle as well as the pupil position are adapted to the primary channel; that is, an adaptation of the in-coupled beam to the beam of primary light coming from the a primary object 22 and the microscope objective 18 (as indicated by arrows 20) is achieved with respect to the position and angle of the in-coupled beam in that this beam, for example, has a slight angle with respect to the optical axis.

A further advantage of this optical arrangement is that the two grating halves can be configured as one individual transmission grating 7. For the angles, the following relationships apply in accordance with the invention: $\alpha_1 = \beta_2$ and $\beta_1 = \alpha_2$. The refractive indices can be omitted in this relationship because the conditions (2) and (3) are each satisfied in the same medium.

The element 14 can, for example, be mounted in a microscope (diameter of the primary light channel approximately 22 mm) with a thickness of 3 mm; whereas, in the classical solution, at least 25 mm would be required utilizing a partially transmissive mirror.

Figure 4:
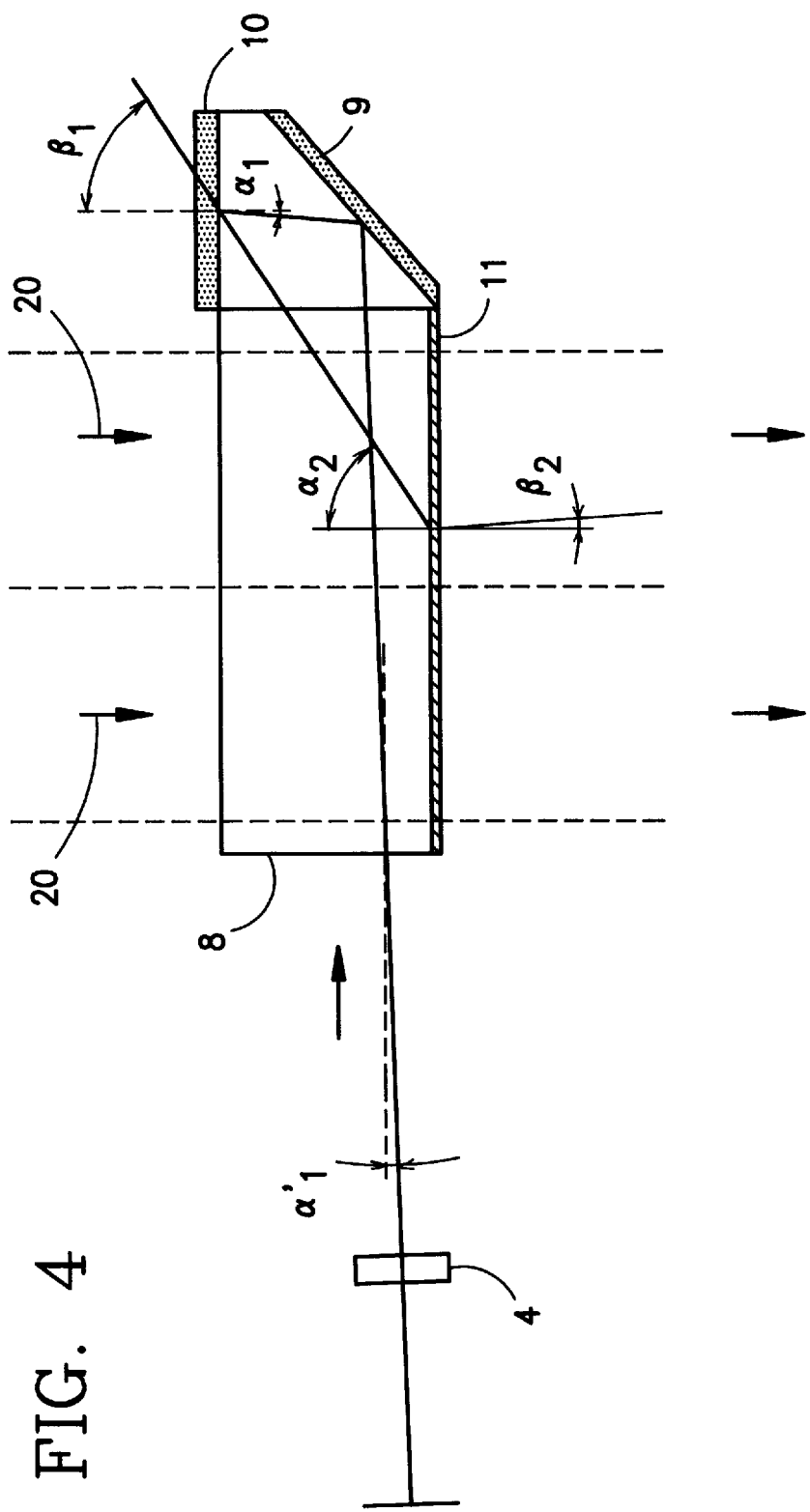

A further special embodiment of the invention is shown in FIG. 4 wherein the direction of the primary light is indicated by arrows 20. The light from the object is introduced into a glass plate 8 via an in-coupling optic 4. A mirror flank 9 and a reflection grating 10 are provided on the opposite end outside of the primary light channel. The light to be coupled in passes via the mirror 9 and the reflection grating 10 to a transmission grating 11 which is positioned on the lower side of the glass plate 8. At the transmission grating 11, the light is diffracted in the same manner as in the embodiment of FIG. 3.

The transmission grating 11 is applied over the entire optically effective surface of the primary light channel in order to obtain a homogeneous effect. The following angle relationships apply:

$$n * \sin(\alpha_1) = \sin(\beta_2);$$

$$\beta_1 = \alpha_2;$$

$$\alpha_1' = \arcsin(n * \sin(\alpha_1))$$

wherein:

n is the index of refraction of the glass carrier.

The invention is, however, not limited to the embodiments described above.

Arrangements with more than two diffractive elements are likewise conceivable but the total transmission for the light to be coupled in is significantly reduced. The diffractive elements can be produced holographically, mechanically or digitally.

The invention can be applied in viewing microscopes, comparison microscopes or surgical microscopes where, because of reduced available space, the use of classical mirror arrangements for coupling in additional images or illuminations is not possible.

It is understood that the foregoing description is that of the preferred embodiments of the invention and that various changes and modifications may be made thereto without departing from the spirit and scope of the invention as defined in the appended claims.

What is claimed is:

1. A microscope for providing an image of a primary object, the microscope comprising:

a microscope objective lens defining an optical axis and transmitting light from said primary object along said optical axis;

a transmitting lens mounted on said optical axis for imaging said primary object into an intermediate image plane as an intermediate image;

said microscope objective lens and said transmitting lens conjointly defining a beam path;

a light diffractive element mounted in said beam path between said microscope objective lens and said transmitting lens for coupling a light beam into said beam path from a secondary object disposed laterally of said optical axis whereby said transmitting lens forms an image of said secondary object also in said intermediate image plane;

a reflective element for coacting with said diffractive element to couple said light beam from said secondary object into said beam path of said microscope;

said diffractive element being a first diffractive element;

optic means for introducing said light beam from said secondary object into said first diffractive element; and, a second diffractive element for receiving said light beam from said first diffractive element to couple said light beam from said secondary object into said beam path of said microscope.

2. The microscope of claim 1, wherein said microscope has a light channel for said beam path and said light channel has an optically effective area; and, said first diffractive element has an optically effective area corresponding at least to the optically effective area of said light channel.

3. The microscope of claim 1, wherein said first diffractive element is a transmission grating.

4. The microscope of claim 1, wherein said secondary object is a picture reproduction device.

5. The microscope of claim 4, wherein said picture reproduction device is a display screen.

6. The microscope arrangement of claim 4, wherein said picture reproduction device is an LCD display.

7. The microscope of claim 1, wherein said secondary object is a light source.

8. The microscope of claim 1, wherein said secondary object is a supplementary image, additional data or additional illumination.

9. A microscope for providing an image of a primary object, the microscope comprising:

a microscope objective lens defining an optical axis and transmitting light from said primary object along said optical axis;

a transmitting lens mounted on said optical axis for imaging said primary object into an intermediate image plane as an intermediate image;

said microscope objective lens and said transmitting lens conjointly defining a beam path;

a light diffractive element mounted in said beam path between said microscope objective lens and said transmitting lens for coupling a light beam into said beam path from a secondary object disposed laterally of said optical axis whereby said transmitting lens forms an image of said secondary object also in said intermediate image plane;

said diffractive element having first and second gratings having essentially the same grating constant and has an upper side; and, said gratings being disposed relative to each other so as to cause a diffraction angle ($\beta_1$) of said light beam from said secondary object at said first grating to be equal to the incident angle ($\alpha_1$) of said light beam from said secondary object at said second grating after reflection at said upper side and so as to cause the incident angle ($\alpha_1$) of said light beam from said secondary object at said first grating to be equal to the diffraction angle ($\beta_1$) of said light beam from said secondary object at said second grating.

10. A microscope for providing an image of a primary object, the microscope comprising:

a microscope objective lens defining an optical axis and transmitting light from said primary object along said optical axis;

a transmitting lens mounted on said optical axis for imaging said primary object into an intermediate image plane as an intermediate image;

said microscope objective lens and said transmitting lens conjointly defining a beam path;

a light diffractive element mounted in said beam path between said microscope objective lens and said transmitting lens for coupling a light beam into said beam path from a secondary object disposed laterally of said optical axis whereby said transmitting lens forms an image of said secondary object also in said intermediate image plane;

said light diffractive element including a glass plate having a side facing toward said transmitting lens and a transmission grating formed on said side;

said glass plate having first and second ends extending transversely to said transmission grating;

said light diffractive element further including a mirror and a reflection grating at said second end; and, optic means for introducing said light beam from said secondary object through said first end into said glass plate so as to cause said light beam to pass via said mirror and said reflection grating to said transmission grating whereat said light beam is diffracted into said beam path and toward said intermediate image plane.

* * * * *

UNITED STATES PATENT AND TRADEMARK OFFICE
CERTIFICATE OF CORRECTION

PATENT NO. : 5,835,263
DATED : November 10, 1998
INVENTOR(S) : Hans-Juergen Dobschal It is certified that error appears in the above-identified patent and that said Letters Patent is hereby corrected as shown below:

In column 6, line 5: delete "$\beta_1$" and substitute -- $\beta_2$ -- therefor.

Signed and Sealed this

Eighteenth Day of May, 1999

*Attest:*

*Attesting Officer*

Q. TODD DICKINSON

*Acting Commissioner of Patents and Trademarks*